May 21, 1929.　　W. S. LANGFORD　　1,714,428
WINCH ATTACHMENT
Filed Nov. 11, 1925　　3 Sheets-Sheet 1

Inventor
W. S. Langford
By Bacon & Thomas
Attorneys

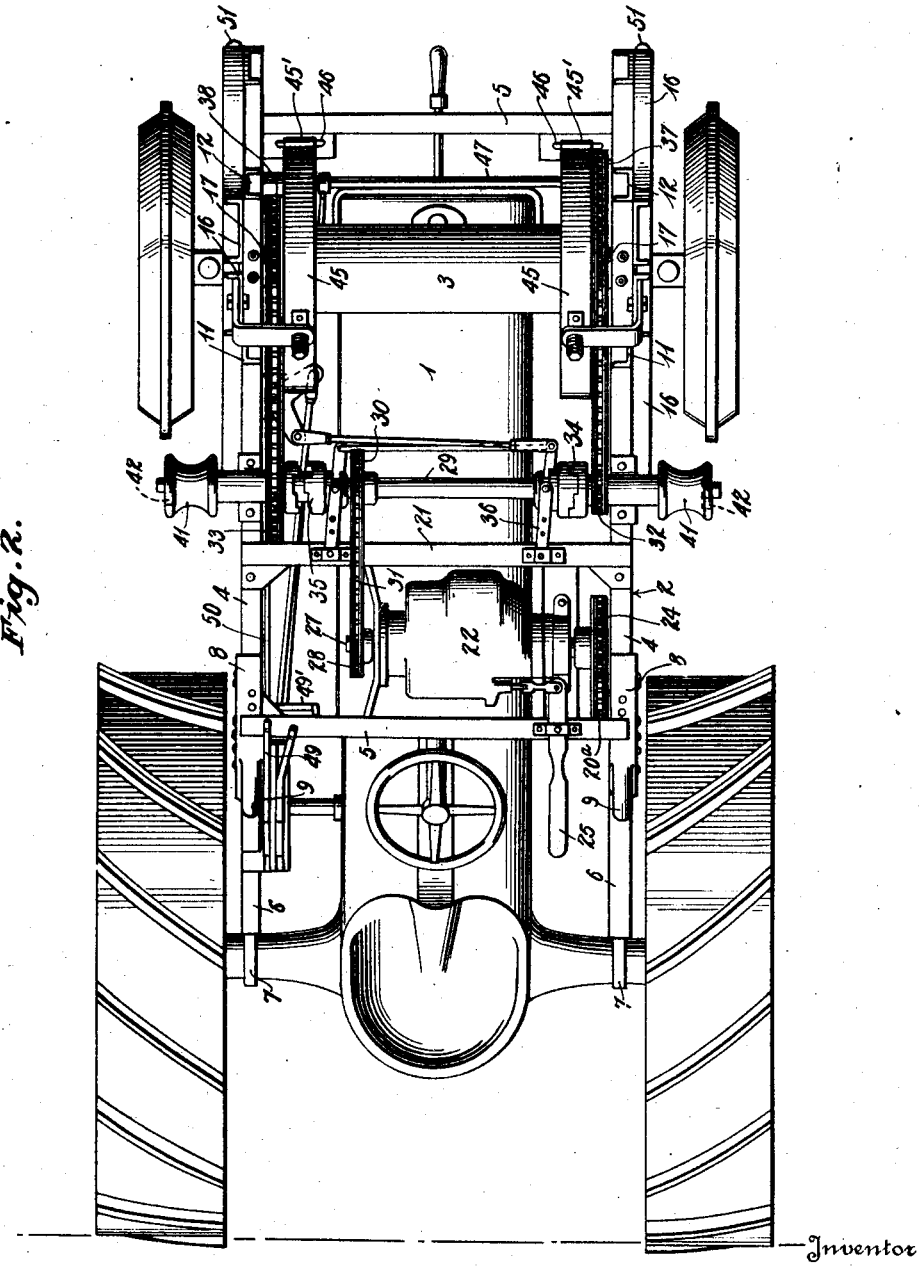

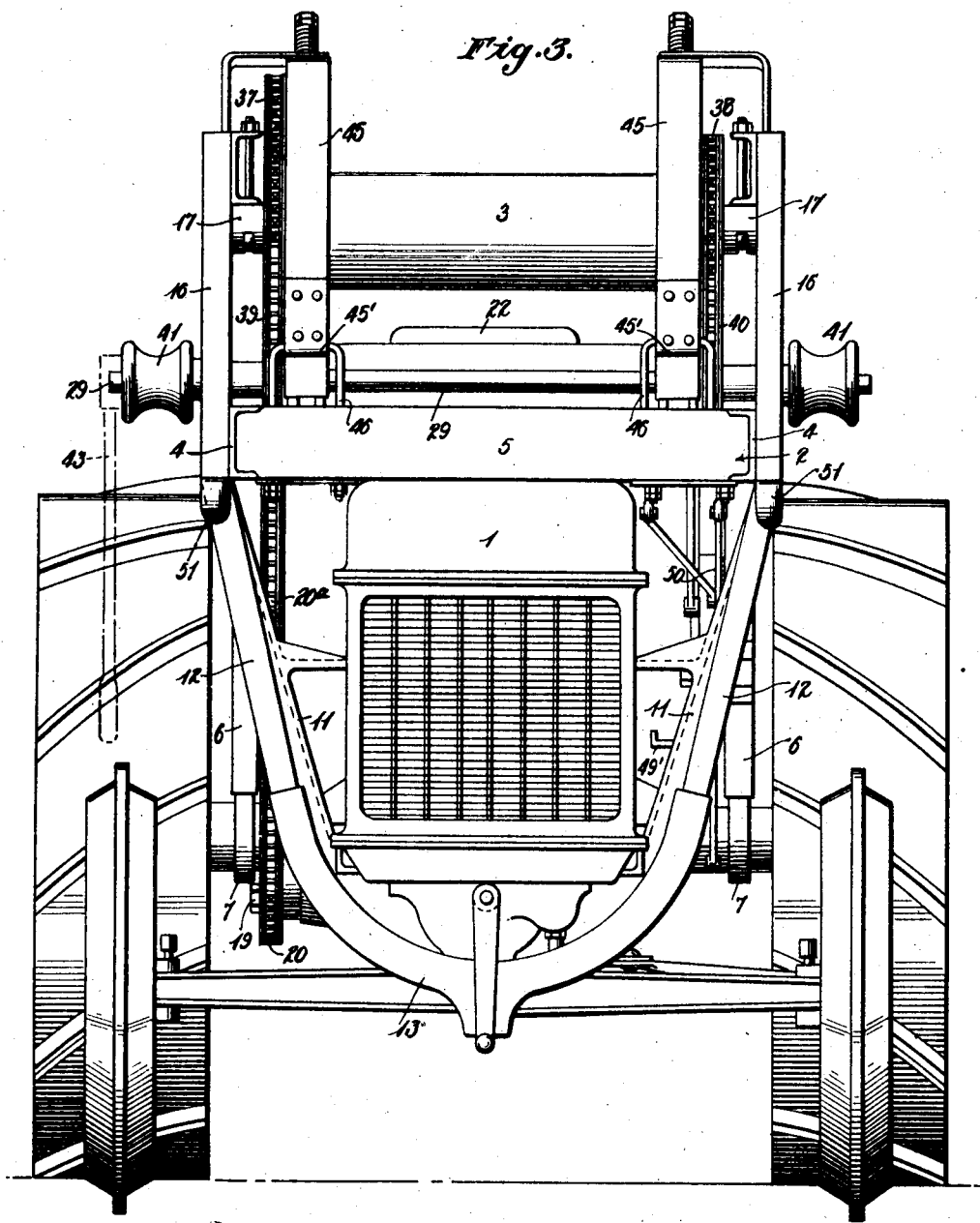

Patented May 21, 1929.

1,714,428

UNITED STATES PATENT OFFICE.

WILLIAM S. LANGFORD, OF WICHITA FALLS, TEXAS.

WINCH ATTACHMENT.

Application filed November 11, 1925. Serial No. 68,436.

My invention relates to a winch attachment for power driven tractors and has for its object the provision of a simplified attachment of exceedingly rugged structure, which can be economically manufactured and readily applied to a power driven tractor without necessitating any structural change therein. It is specifically an object of my invention to provide a winch attachment that is wholly carried within the length of the tractor, thus obviating the necessity of any extensions or other complicated mechanism.

My invention is particularly applicable for use in oil field work for pulling rods or tubing, as well as tools or bailing. However, it is obvious that my improved winch is applicable for use wherever it is desired to move loads by means of a flexible element, such as a rope or cable.

For the purposes of illustration, I have shown my invention as applied to a well-known type of tractor. However, it will be understood that this is merely illustrative and that my invention can be employed with other types of tractors.

Fig. 2 is a plan view of the structure shown in Fig. 1.

Fig. 3 is a front end elevation of the structure shown in Fig. 1.

Figure 1:
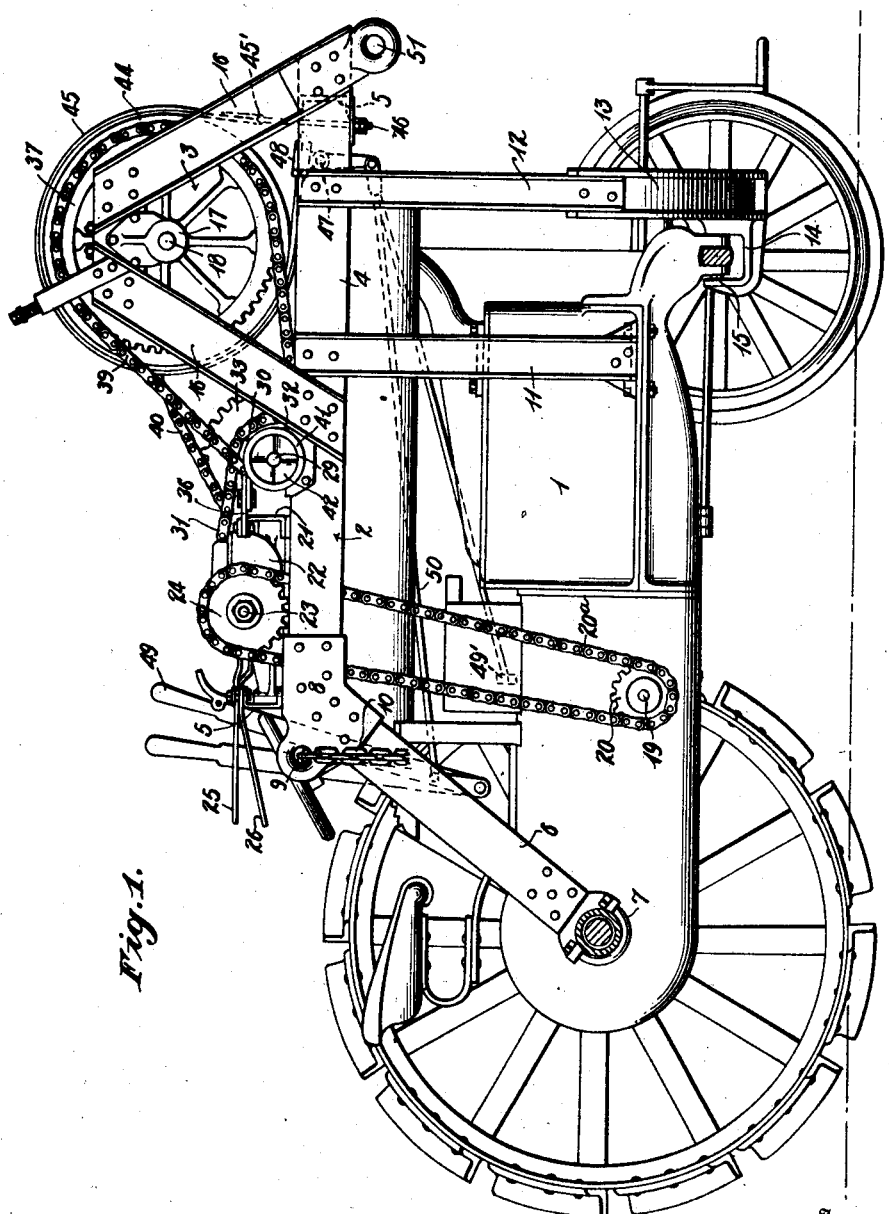
Fig. 1 is a view in side elevation of a tractor showing my winch attachment applied thereto.

Referring to the drawing, the numeral 1 designates generally the tractor to which my invention is applied. I mount a frame 2 on the tractor 1 to carry the winch 3. The frame 2 comprises a main rectangular structure, comprising the side members 4 and the end members 5. This rectangular structure is connected at its rear end to the rear axle housing of the tractor through the medium of the inclined channel pieces 6, which are securely clamped to the rear tractor axle housing, as indicated at 7. These inclined channel members are connected to the rectangular structure through the medium of structural L members 8, which in addition to providing a secure joint between the inclined channel members and the rectangular structure, are also provided with eyes 9, through which a chain or the like 10 may be passed for securely anchoring the structure to some stationary object. At a substantial distance from the front end of the rectangular structure, I provide a vertical channel member 11, at each side thereof, which channel member is securely anchored to the tractor frame. In addition to the vertical channel members 11, I further support the front end of the rectangular structure by the provision of additional channel members 12, one at each side of the front of the rectangular structure, which channel members 12 are rigidly secured to the casting 13, which is pivotally carried at the center of the front axle of the tractor. This casting 13 is provided with a rearwardly extending U-shaped portion 14, which is adapted to fit around the lower edge of the front axle of the tractor and be secured thereto by the pivot bolt 15. The winch 3 is supported directly above the front axle and radiator of the tractor by the inverted V-shaped supporting members 16. These members 16 are rigidly secured to the rectangular structure of the attachment frame and each carries a depending bearing member 17, in which the main winch shaft 18 is rigidly secured and upon which the drum of winch 3 is freely rotatable.

The operating mechanism for the winch may be described as follows:

The tractor 1 is provided with a power take-off shaft 19 extending through the transmission housing, which shaft carries the sprocket gear 20. The rectangular structure of the attachment frame 2, heretofore described, is provided with an intermediate cross member 21. Supported by the rear cross member 5 and the intermediate cross member 21, is an auxiliary sliding gear multiple speed transmission 22. Extending from the auxiliary transmission housing is a driven shaft 23, also carrying a sprocket gear 24 similar to the sprocket gear 20. A roller chain 20$^a$ connects the sprocket gears 20 and 24. The auxiliary transmission housing is of conventional form and provided with levers 25 and 26 for securing the different forward and reverse speeds of the transmission. Extending from the auxiliary transmission housing at the end opposite from the shaft 23 is a shaft 27 carrying a sprocket gear 28. Mounted on the attachment frame at a point intermediate the auxiliary transmission housing and the supporting members 16 is a countershaft 29. This countershaft 29 has fixedly secured thereto the sprocket gear 30, which is driven from the sprocket gear 28 by means of the roller chain 31. The countershaft 29 has loosely mounted thereon adjacent one end thereof, sprocket gear 32 and adjacent the other end has loosely mounted thereon a sprocket gear 33 of greater diameter than the sprocket gear 32. Clutch mechanisms 34 and 35 are provided on the shaft 29 for obtaining an engagement with either the gear 32 or the gear 33. These clutch mechanisms 34 and 35 are operated by the interlocking operating levers 36, the arrangement being such that neither clutch can be engaged until the other is disengaged. The drum of winch 3 has rigidly secured thereto at one end thereof, a large sprocket gear 37 and at the other end thereof a smaller sprocket gear 38. A roller chain 39 establishes a driving connection between the sprocket gear 32 and the sprocket gear 37, while a roller chain 40 establishes the driving connection from the sprocket gear 33 and the sprocket gear 38.

It will therefore be seen that power from the tractor engine is transmitted to the winch through the gears 20 and 24, the auxiliary transmission 22, gears 28 and 30, countershaft 29 and from the countershaft 29 through either the gears 32 and 37 or the gears 33 and 38, to the winch drum, depending upon whether a slow or fast speed of the winch is desired.

The countershaft 29 is provided at either end with a reeling spool as indicated at 41. Each of these spools is provided with a clutching face 42 adapted to cooperate with the clutching face of a crank 43. This crank may be employed for starting the tractor engine in the event that the position of the tractor renders the usual tractor crank unavailable.

The winch 3 is provided at either end thereof with a brake drum 44, about which the brake members 45 extend. These brake members 45 are anchored to the attachment frame as indicated at 45' and are connected at one end to the attachment frame by means of the adjustable eye bolts 46. The opposite ends of these brake members are adjustably secured to the transversely extending rod 47 as indicated at 48. It will be thus seen that ample provision is made for adjustment of the brake members 45. These brake members are adapted to be actuated by the lever 49 through the intermediate link mechanism indicated generally at 50 or they may be actuated through the foot lever 49' also associated with the link mechanism 50.

The front cross member 5 of the attachment frame is adapted to carry bumping blocks, which provide a means for holding the tractor at any desired distance from the mast or pulling machine, with which it is operated. The attachment frame it will be noted, is provided at the extreme front end thereof with eye members 51 similar to the eye members 9 through the medium of which the structure can be additionally anchored.

From the foregoing, it will be seen that I have provided a compact winch attachment, which can be readily applied to a tractor without in any way altering the existing structure of the tractor. The winch is securely held in position and positively driven from the tractor.

What I claim as my invention is:

1. A winch attachment for tractors, comprising a supporting frame located directly above the tractor engine, an auxiliary transmission rigidly secured to the rear end of said supporting frame, a winch drum rotatably mounted adjacent the front end of said frame, a countershaft mounted on said frame intermediate said auxiliary transmission and winch drum, means for driving said winch drum from the tractor engine comprising a driving connection from the tractor engine to said auxiliary transmission, and a driving connection from said auxiliary transmission to said winch drum including said countershaft and means associated with said countershaft for cranking the tractor engine.

2. A winch attachment for tractors, comprising a supporting frame located directly above the tractor engine, an auxiliary selective speed changing and direction reversing transmission rigidly secured to the rear end of said supporting frame and substantially vertically of the power take-off shaft of the tractor, a winch drum rotatably mounted adjacent the front end of said frame and directly above the front tractor axle, a countershaft mounted on said frame intermediate said auxiliary transmission and winch drum, means for driving said winch drum from the tractor engine comprising a driving connection from the tractor engine take-off shaft to said auxiliary transmission, and a driving connection from said auxiliary transmission to said winch drum including said countershaft and a clutch mechanism carried by said countershaft.

3. A winch attachment for tractors comprising a supporting frame attached to the tractor body, an auxiliary transmission secured to said supporting frame, a winch drum rotatably mounted upon the frame, means for driving said drum from the tractor engine comprising a driving connection from the engine to said auxiliary transmission, and a driving connection from said transmission to said winch drum, and means associated with said last mentioned means for cranking the tractor engine.

4. A winch attachment for tractors comprising a frame carried by the tractor and confined within the vertical margins of the latter, said frame having a portion thereof located above the engine of the tractor, a winch drum, means for rotatably mounting said winch drum upon said frame portion entirely above the tractor engine, said means comprising a pair of inverted V-shaped brackets connected one to each side of the frame, a bearing member rigidly fastened to and depending from the apices of each of said brackets, and a shaft fastened at its ends to said bearing members upon which said winch drum is rotatably mounted, and a power connection between the winch drum and the tractor engine.

5. In a winch attachment for tractors, the combination with a tractor and its power take-off shaft, of a supporting frame located directly above the tractor engine, an auxiliary selective speed changing and direction reversing transmission rigidly secured to the said supporting frame and substantially vertical of said power take-off shaft, a winch drum rotatably mounted on said frame and directly above the front axle of the tractor, and means for driving said winch drum from the power take-off shaft through said auxiliary transmission.

6. A winch attachment for tractors, comprising a supporting frame including side members located above the tractor engine, depending members for mounting the side members upon the front and rear axles of the tractor, a transverse brace for holding the front ends of the side members in proper spaced relation, a pair of parallel transverse braces for holding the rear ends of the side members in proper spaced relation, a winch drum rotatably supported by the front end portions of the side members, an encased auxiliary transmission unit supported by the pair of transverse braces, and means for driving said winch drum through said auxiliary transmission.

7. In an attachment for tractors, the combination with a tractor and its power take-off shaft, of a supporting frame located directly above the tractor engine, an auxiliary transmission secured to the said supporting frame substantially vertical of said power take-off shaft, a work performing unit mounted on said frame directly above the front axle of the tractor, and means for driving said work performing unit from the power take-off shaft through said auxiliary transmission.

8. An attachment for tractors, comprising a supporting frame including side members located above the tractor engine, depending members for mounting the said side members upon the front and rear axles of the tractor, a transverse brace for holding the front ends of the side members in proper spaced relation, a pair of transverse braces for holding the rear ends of the side members in proper spaced relation, a work performing unit supported by the front end portions of the side members, an auxiliary transmission unit supported by the pair of transverse braces, and means for driving the work performing unit through said auxiliary transmission.

9. A winch attachment for tractors comprising a frame carried by the tractor, a winch drum, means for mounting said winch drum upon said frame, said means comprising a pair of inverted V-shaped brackets connected one to each side of the frame, a bearing member depending from the apex of each of said brackets, a shaft fastened at its ends to said bearing members upon which said winch drum is rotatably mounted; and a power connection between the winch drum and the tractor engine.

In testimony whereof I affix my signature.

WILLIAM S. LANGFORD.